(12) United States Patent
Cheng

(10) Patent No.: US 8,964,004 B2
(45) Date of Patent: Feb. 24, 2015

(54) THREE CHANNEL REFLECTOR IMAGING SYSTEM

(75) Inventor: Fuhua Cheng, Lexington, KY (US)

(73) Assignee: Amchael Visual Technology Corporation, Hsinchu, ROC (TW)

( * ) Notice: Subject to any disclaimer, the term of this patent is extended or adjusted under 35 U.S.C. 154(b) by 465 days.

(21) Appl. No.: 12/885,810

(22) Filed: Sep. 20, 2010

(65) Prior Publication Data

US 2011/0310230 A1 Dec. 22, 2011

Related U.S. Application Data

(60) Provisional application No. 61/356,182, filed on Jun. 18, 2010.

(51) Int. Cl.
*H04N 13/02* (2006.01)
*G02B 27/22* (2006.01)

(52) U.S. Cl.
CPC ........ *H04N 13/0217* (2013.01); *G02B 27/2235* (2013.01); *H04N 2213/003* (2013.01)
USPC .................................. 348/49; 348/47; 348/42

(58) Field of Classification Search
CPC ....................................................... G03B 35/00
USPC .............. 348/49; 396/324, 331; 359/353, 463
See application file for complete search history.

(56) References Cited

U.S. PATENT DOCUMENTS

| | | | |
|---|---|---|---|
| 3,184,630 A | 5/1965 | Greer | |
| 4,475,126 A | 10/1984 | Akins | |
| 4,687,310 A | 8/1987 | Cuvillier | |
| 4,751,570 A | 6/1988 | Robinson | |
| 5,192,969 A * | 3/1993 | Igarashi et al. | 355/22 |
| 5,461,495 A * | 10/1995 | Steenblik et al. | 359/463 |
| 5,532,777 A | 7/1996 | Zanen | |
| 5,546,226 A | 8/1996 | Herington | |
| 5,570,150 A | 10/1996 | Yoneyama et al. | |
| 5,727,242 A * | 3/1998 | Lo et al. | 396/324 |
| 5,757,548 A | 5/1998 | Shimomukai | |
| 5,835,133 A | 11/1998 | Moreton et al. | |
| 5,892,994 A | 4/1999 | Inaba | |
| 6,122,597 A | 9/2000 | Saneyoshi et al. | |

(Continued)

OTHER PUBLICATIONS

International Search Report dated Oct. 7, 2011—PCT/US2011/040247.

(Continued)

*Primary Examiner* — Thao X Le
*Assistant Examiner* — Long Le
(74) *Attorney, Agent, or Firm* — King & Schickli, PLLC

(57) ABSTRACT

A system for providing a three-dimensional representation from a single image includes a reflector apparatus for providing an image of a scene comprising three adjacent views of the scene. The apparatus defines a left light path, a center light path, and a right light path, wherein each of the left light path and the right light path comprise opposed reflective surfaces for redirecting light, whereby light passing through the left light path, light passing through the right light path, and light passing through the center light path converge at a nodal point of an imager to create an image of the scene providing three adjacent views of the scene arrayed in a three-by-one rectangular grid. A client computing device receives data from the imager and transforms the data into a stereoscopic image or an image-plus-depth rendering, and/or converts or switches back and forth between two-dimensional and three-dimensional images.

17 Claims, 13 Drawing Sheets

(56) References Cited

U.S. PATENT DOCUMENTS

| | | |
|---|---|---|
| 6,208,813 B1 | 3/2001 | Carlsson et al. |
| 6,278,460 B1 | 8/2001 | Myers et al. |
| 6,643,396 B1 * | 11/2003 | Hendriks et al. ............. 382/154 |
| 6,668,082 B1 | 12/2003 | Davison et al. |
| 6,819,488 B2 | 11/2004 | Zanen |
| 6,915,073 B2 | 7/2005 | Seo |
| 6,963,661 B1 | 11/2005 | Hattori et al. |
| 6,996,339 B2 | 2/2006 | Miyoshi et al. |
| 7,061,532 B2 | 6/2006 | Silverstein |
| 7,065,242 B2 | 6/2006 | Petrov et al. |
| 7,075,735 B2 | 7/2006 | Nozawa et al. |
| 7,106,365 B1 | 9/2006 | Sogawa |
| 7,132,933 B2 | 11/2006 | Nakai et al. |
| 7,170,677 B1 | 1/2007 | Bendall et al. |
| 7,181,136 B2 | 2/2007 | Perisic |
| 7,263,209 B2 | 8/2007 | Camus et al. |
| 7,274,800 B2 | 9/2007 | Nefian et al. |
| 7,362,881 B2 | 4/2008 | Hattori et al. |
| 7,420,750 B2 | 9/2008 | Kuthirummal et al. |
| 7,606,485 B2 | 10/2009 | Ohashi |
| 7,623,781 B1 * | 11/2009 | Sassa ........................... 396/322 |
| 7,710,451 B2 | 5/2010 | Gluckman |
| 7,877,706 B2 | 1/2011 | Albertson et al. |
| 8,267,781 B2 | 9/2012 | Geiss |
| 8,325,978 B2 | 12/2012 | Chai et al. |
| 8,351,651 B2 | 1/2013 | Lee |
| 8,396,252 B2 | 3/2013 | El Dokor |
| 8,417,026 B2 | 4/2013 | Wu et al. |
| 2001/0053287 A1 | 12/2001 | Inaba |
| 2003/0072569 A1 * | 4/2003 | Seo ............................... 396/331 |
| 2003/0072570 A1 * | 4/2003 | Seo ............................... 396/331 |
| 2003/0156187 A1 | 8/2003 | Gluckman et al. |
| 2004/0189720 A1 | 9/2004 | Wilson et al. |
| 2004/0252863 A1 | 12/2004 | Chang et al. |
| 2005/0057806 A1 | 3/2005 | Nozawa et al. |
| 2005/0185050 A1 | 8/2005 | Ohashi |
| 2005/0254817 A1 | 11/2005 | McKee |
| 2006/0077543 A1 | 4/2006 | Miyoshi et al. |
| 2006/0082879 A1 * | 4/2006 | Miyoshi et al. ............... 359/462 |
| 2006/0115119 A1 | 6/2006 | Nagaoka et al. |
| 2006/0204038 A1 | 9/2006 | Yokota et al. |
| 2007/0165306 A1 | 7/2007 | Bendall et al. |
| 2008/0031514 A1 | 2/2008 | Kakinami |
| 2009/0168152 A1 * | 7/2009 | Gelernt et al. ................ 359/353 |
| 2010/0289874 A1 | 11/2010 | Cheng |
| 2013/0063336 A1 | 3/2013 | Sugimoto et al. |

OTHER PUBLICATIONS

Written Opinion dated Oct. 7, 2011—PCT/US2011/040247.

* cited by examiner ated by a swiveling arrangement. In each of these disclosures, a single imager (in each disclosure, a camera), by acquiring light reflected through each of the two light channels defined by the respective system, can provide two virtual cameras and thereby two corresponding images of a scene, that is, left and right views, using that single imager. Each device is generally effective for its intended purpose.

THREE CHANNEL REFLECTOR IMAGING SYSTEM

This utility patent application claims the benefit of priority in U.S. Provisional Patent Application Ser. No. 61/356,182 filed on Jun. 18, 2010, the entirety of the disclosure of which is incorporated herein by reference.

TECHNICAL FIELD

The present invention relates to three dimensional imaging. More particularly, the invention relates to devices and methods for three-dimensional imaging, capable of generating stereoscopic images and image-plus-depth utilizing a single imager and image. A three channel reflector imaging device and system for three dimensional imaging is disclosed.

BACKGROUND OF THE INVENTION

Conventional computer stereo vision provides two imagers such as cameras to obtain images of a scene from different angles. The cameras are separated by a predetermined distance—mimicking the spacing of human eyes. It is then possible for a computer to calculate depths of objects in the scene by comparing images obtained by the two different cameras. This is typically done by superimposing one image on top of the other one to find matching points or regions. The shifted amount is called the disparity. The disparity at which objects in the images best match is used by the computer to calculate their depths.

It is also known in the art to provide a multi-view imaging system which requires only one imager to calculate an object depth. In most cases, such a system uses specially designed mirrors to create virtual imagers or cameras. With the views captured by the real imager and the virtual imagers, a computer is then able to use the same calculations as in conventional computer stereo vision to calculate the depth of an object.

One such multi-view imaging system is disclosed in U.S. Pat. No. 6,643,396. Broadly, this system uses fixed mirrors to define two paths for acquired light, thereby creating two virtual cameras to provide, from a single scene, two images of that scene. Likewise, U.S. Pat. No. 5,532,777 discloses a two-channel imaging system providing two sets of mirrors, wherein an angle and thereby the path of light reflected from those pairs of mirrors may be altered by a swiveling arrangement. In each of these disclosures, a single imager (in each disclosure, a camera), by acquiring light reflected through each of the two light channels defined by the respective system, can provide two virtual cameras and thereby two corresponding images of a scene, that is, left and right views, using that single imager. Each device is generally effective for its intended purpose.

However, improvements in multi-view imaging systems are possible and desirable. In particular, improvements in such systems providing the capacity to generate stereo images, images with depth, and switching back and forth between two dimensional views and three dimensional views are particularly desirable. Obtaining image-plus-depth or switching back and forth between two-dimensional and three-dimensional views is difficult if not impossible using the two-channel systems described above.

SUMMARY OF THE INVENTION

To solve the foregoing problems and address the identified need in the art, the present disclosure provides an imaging system defining three channels or light paths. By use of the present imaging system, in addition to a left view and a right view of a scene obtained from the left and right channels so defined, a third, central view of the scene is provided via a central channel. By use of the present imaging system, it is possible, from a single image captured of a scene, to provide one or more of a stereo image, an image-plus-depth, and/or conversion or switching back and forth between two-dimensional and three-dimensional images.

In one aspect, the present disclosure provides a three-channel reflector defining three channels or light paths, a left light path, a center light path, and a right light path, for providing an image of a scene comprising three adjacent views of the scene. Each of the left light path and the right light path comprise opposed reflective surfaces for redirecting light through the corresponding light path. The left light path and the right light path reflective surfaces are arrayed whereby light passing through the left light path, light passing through the right light path, and light passing through the center light path converge at a nodal point of an imager to reach its image pickup device, examples including without limitation charge-coupled devices (CCD) or complementary metal oxide semiconductors CMOS.

In another aspect, the present disclosure provides an imaging system using the three-channel reflector described above. By use of the imaging system, in addition to a left view and a right view of a scene obtained from the left and right channels so defined, a third, central view of the scene is provided via a central channel. By use of the present imaging system, it is possible, from a single image captured of a scene, to provide one or more of a stereo image, an image-plus-depth, and/or conversion or switching back and forth between two-dimensional and three-dimensional images.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims. Various patent and non-patent citations are discussed herein. Unless otherwise indicated, any such citations are specifically incorporated by reference in their entirety into the present disclosure.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention. Also, it is to be understood that other embodiments may be utilized and that process, reagent, materials, software, and/or other changes may be made without departing from the scope of the present invention.

To solve the foregoing and other problems and address the identified need in the art, the present disclosure provides an imaging system defining three channels or light paths. By use of the present imaging system, in addition to a left view and a right view of a scene obtained from the left and right channels so defined, a third, central view of the scene is provided via a central channel. By use of the present imaging system, it is possible, from a single image captured of a scene, to provide one or more of a stereo image, an image-plus-depth, and/or conversion or switching back and forth between two-dimensional and three-dimensional images.

Figure 1:
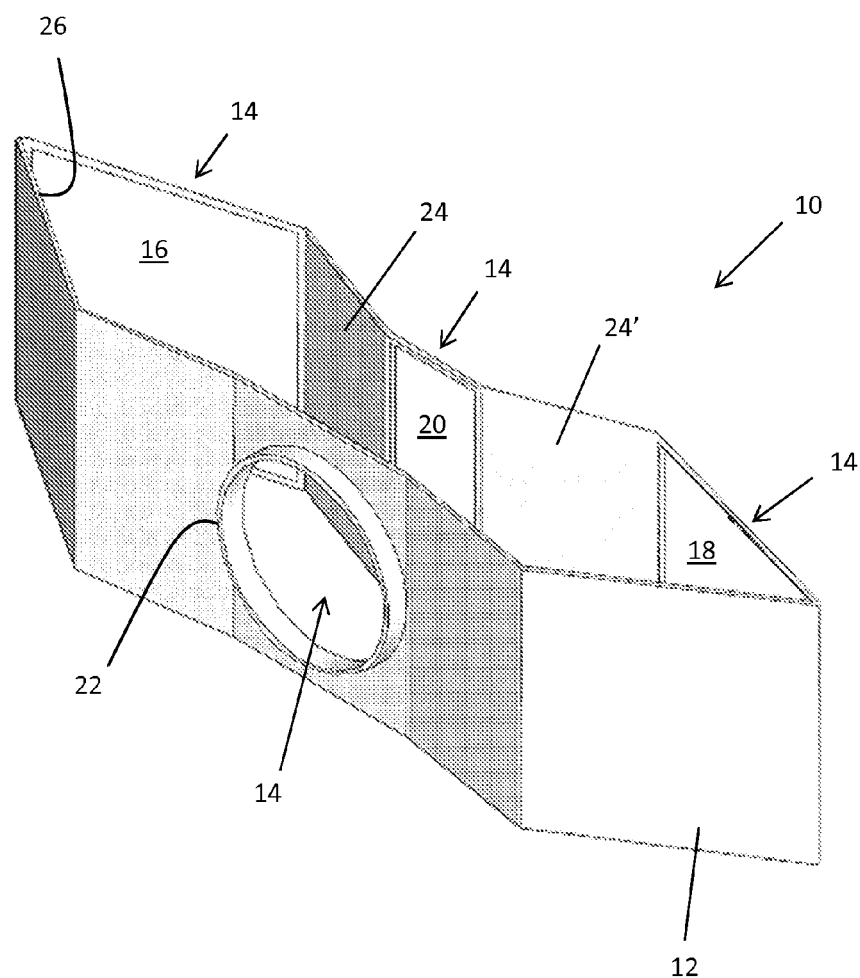
FIG. 1 shows a perspective view of a three-channel reflector according to the present disclosure.

In one aspect, the present invention provides a three-channel reflector 10. As shown in FIG. 1, the three channel reflector includes at least one side wall 12 provided with apertures 14 defining defines three channels or light paths, a left channel 16, a right channel 18, and a center channel 20 (represented as arrows A, B, and C, respectively; see FIG. 2). The three-channel reflector includes also a top and a bottom (not shown for convenience) for preventing passage of light other than through apertures 14. An adaptor 22 may be provided for attaching the three-channel reflector 10 to an imager (not shown). A number of adaptor types, such as a threaded female adaptor for cooperatively joining with a corresponding threaded male adaptor on an imager, a friction fit adaptor, a snap fit adaptor, or any suitable adaptor is contemplated.

Figure 2:
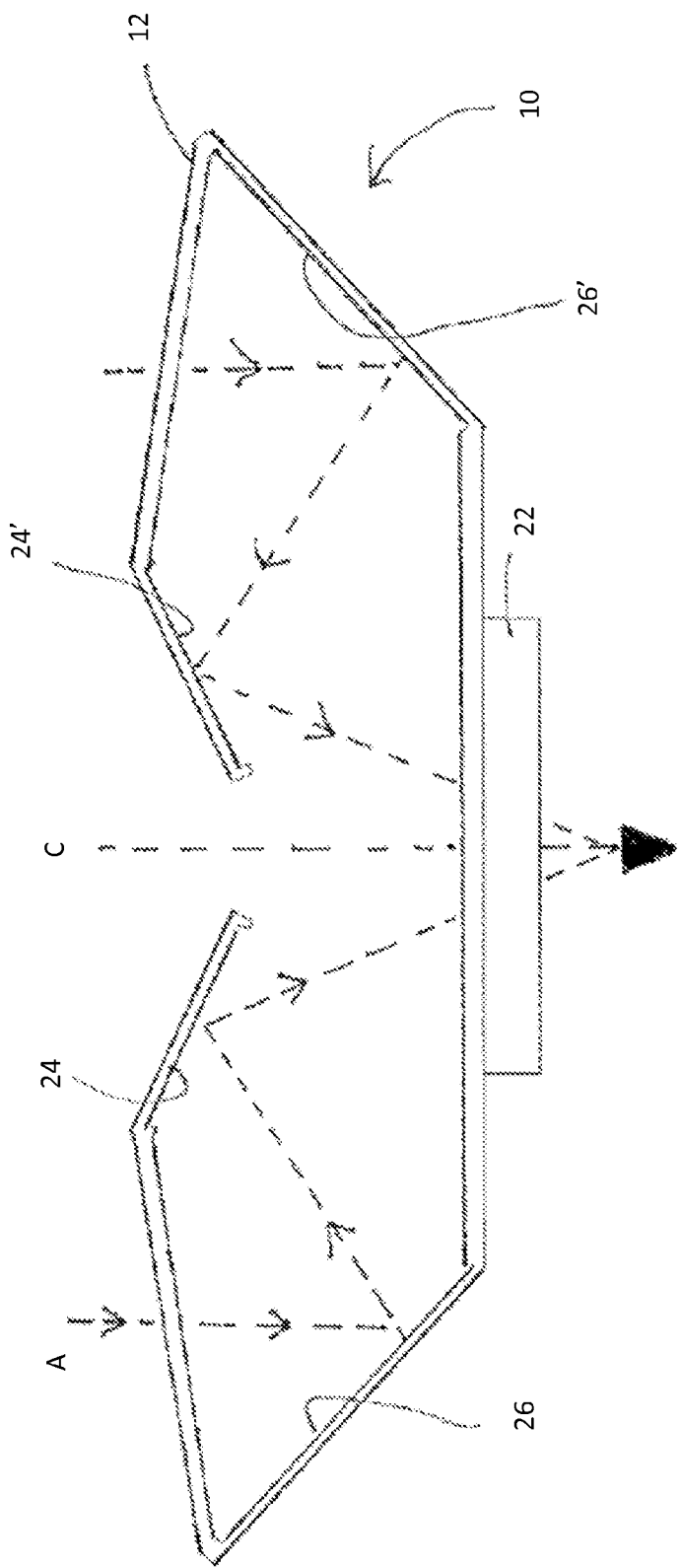
FIG. 2 is a top view of the reflector of FIG. 1.

Each of the left and right channels 16, 18 includes reflective surfaces 24, 26, 24', 26' for redirecting light passing through left and right channels 16, 18 to pass through center channel 20 (see FIG. 2). As will be discussed below, the three channel reflector 10 is configured whereby incoming light passing through each of left channel 16, right channel 18, and center channel 20 converges at a nodal point of an imager (that is, the point inside a lens wherein light paths cross before being focused onto a film plane of an imager such as a camera) attached to the three-channel reflector. The reflective surfaces are selected to substantially prevent double reflections or double images, either by selection of reflective materials or by providing suitable coatings as are known in the mirror arts.

The three-channel reflector 10 may be fabricated of any materials suitable for the purpose. In one embodiment suitable for mass production, the three-channel reflector 10 may be fabricated of a single piece of polymethylmethacrylate (PMMA or acrylic) or glass, such as by injection molding, and provided with suitable reflective surfaces. Likewise, any suitable reflective surface may be used to provide reflective surfaces 24, 26, 24', 26', including suitably reflective metal surfaces such as aluminum, mercury, or silver, conventional glass mirrors (treated as discussed above to prevent double imaging), and the like. In this embodiment the reflective surfaces 24, 26, 24', 26' may be plated to the respective portions of the unitary three channel reflector 10 body, such as by a deposition process known in the art. For example, the areas of the three channel reflector 10 wherein the reflective surfaces 24, 26, 24', 26' are to be provided may be plated with suitably reflective aluminum.

In use, the three-channel reflector 10 provides, in addition to a view of a scene from the center channel 20, a left view from left channel 16 and a right view from right channel 18. These views are generated via light reflecting the scene twice by the reflective surfaces 24, 26, 24', 26' as described above. Accordingly, an image captured of a scene via the three-channel reflector 10 provides three different views of the scene in one image (see FIG. 3). As shown, the left view, the right view, and the center view are arranged in a 3×1 rectangular grid. Information from these different views to generate stereoscopic image or image-plus-depth of the scene. Hence, with the three-channel reflector of the present disclosure, it is possible to provide three-dimensional images with only one imager and one image.

Figure 4:
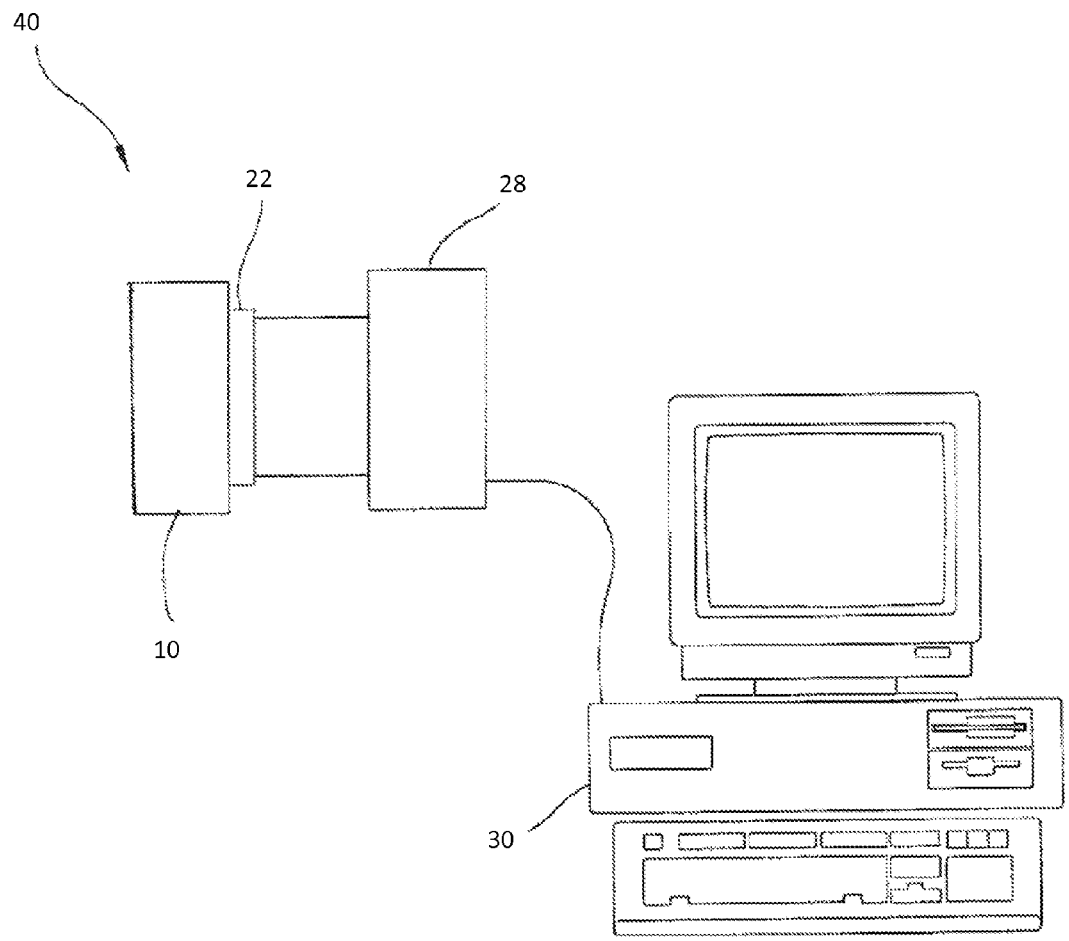
FIG. 4 shows a three-channel reflector-based imaging system according to the present disclosure.
Figure 5:
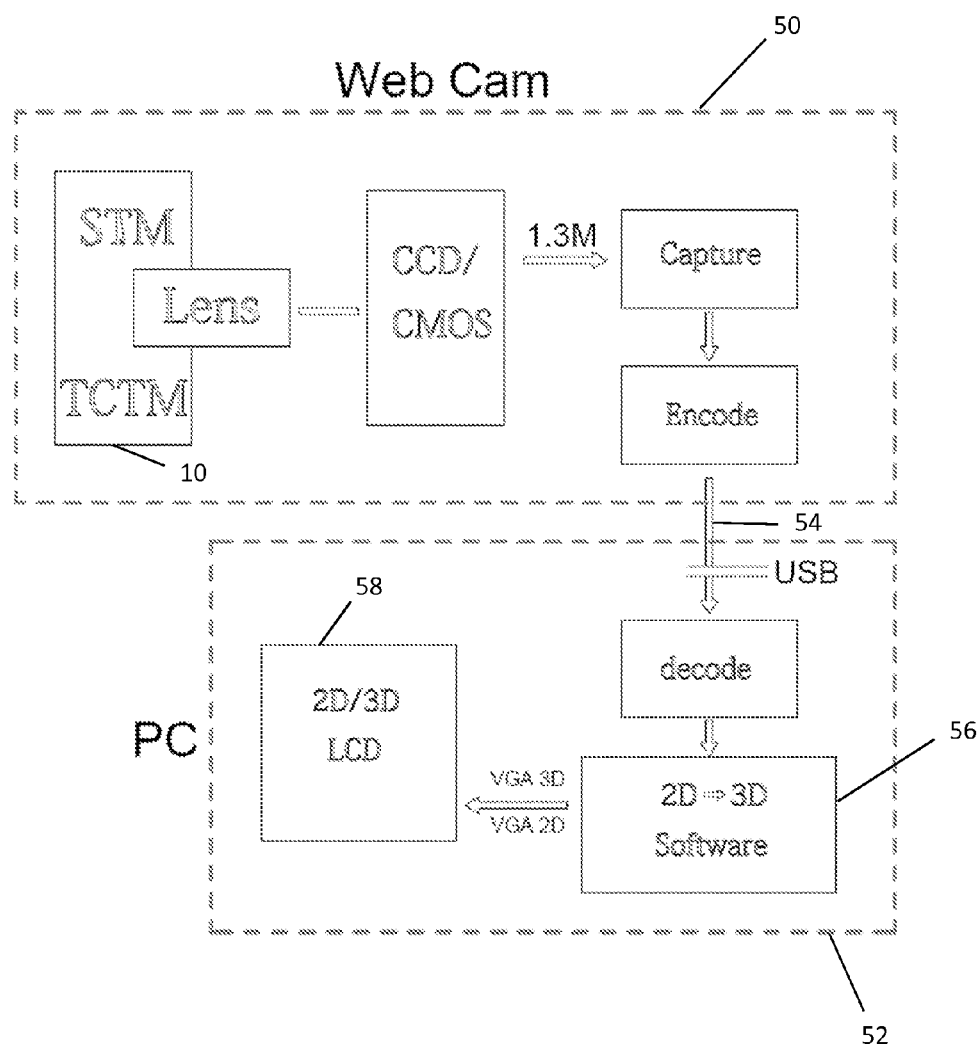
FIG. 5 schematically depicts the imaging system of FIG. 4.

Still further, the present disclosure provides an imaging system 40 (see FIG. 4), including a three-channel reflector 10 as described above, an imager 28 capable of translating an image into digital data, and a computing device 30. Imager 28 is attached to the three-channel reflector 10 by adaptor 22. The system 40 also includes a set of stereoscopic image generation, depth computation, modeling and rendering programs. The system 40 of FIG. 4 is depicted schematically in FIG. 5, in the depicted embodiment being a Web camera 50, incorporating the three-channel reflector 10 as described above and further being operatively connected to a computing device such as a PC. As seen therein, images captured through the three-channel reflector 10 by the Web camera 50 are encoded, such as by conventional charge-coupled device (CCD) or complementary metal oxide semiconductor (CMOS) technology and transferred to the PC 52 for decoding. Such transfer may be wired or wireless, such as via the USB cable 54 depicted in FIG. 5. Software, i.e., the stereoscopic image generation, depth computation, modeling, and rendering programs 56 discussed above, then convert the data into two-dimensional and/or three dimensional images for display, such as on the LCD monitor 58 depicted in the figure. The algorithms used by the described software programs in rendering the desired images are discussed in greater detail below.

In brief, an image-plus-depth is generated by combining the central view of an image (such as the one in FIG. 3) captured by the system 40 with a depth map of the center view. Once an image-plus-depth is computed, the image may be viewed from different viewpoints. Once a region in the center view of the image is specified, a stereoscopic image is generated by taking appropriate regions from the left view and the right view of that image and having these regions interlaced. The left view and the right view have to be rectified first. As is known in this art, image rectification is a transformation process used to project two-or-more images onto a common image plane. Image distortion is corrected by transforming the image into a standard coordinate system.

Figure 3:
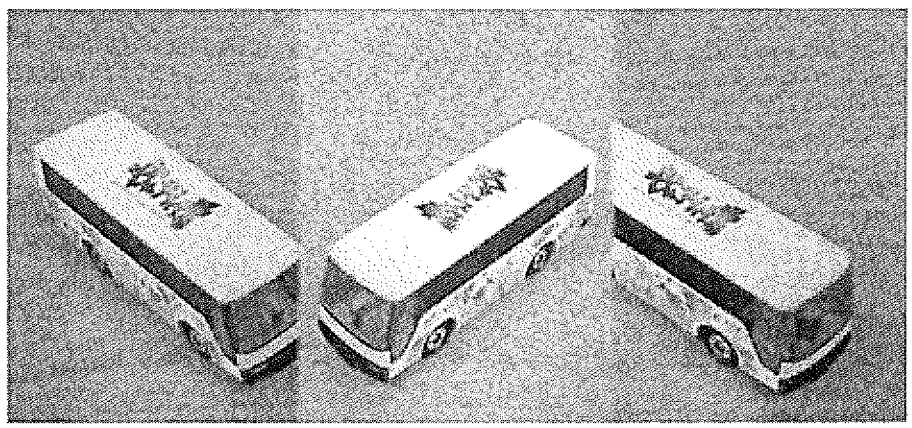
FIG. 3 shows a representative three-view image taken by a digital camera through the reflector of FIG. 1.

In developing the above-described devices and systems, consideration was given to the design of a three-channel reflector 10 able to cover an object of specific size at specific distance. As shown in FIG. 3, the size of the left view and the right view in an image captured through the three-channel reflector 10 were larger than the central view. Hence, the image was found suitable to generate good stereoscopic images.

The three-channel reflector 10 described above is shown schematically in FIG. 6. Four reflective surfaces (reference numerals 24, 26, 24', 26' in FIG. 2) were provided, designated IJ, EF, HG and LK. IJ and LK were designated outward mirrors (i.e., reflecting light entering the three-channel reflector 10) and EF and HG were designated inward mirrors (i.e., reflecting light from the outward mirrors back through center channel 20 towards an imager). IJ and KL were thus designated the "outward mirror pair", and EF and GH were designated the "inward minor pair". C was the location of the imager, in the present example a digital camera (that is, C was the nodal point or pinhole of the camera).

A three-dimensional coordinate system was defined as follows: O was the origin of the coordinate system, ON was the positive x-axis, and OC was the positive z-axis. The virtual image plane was the plane that is perpendicular to the z-axis at the point O. Parameters and angles that were needed for the construction of a three-channel reflector 10 are defined below:

$|OC|=d$; (hence, C=(0,0,d))

$|OE|=r$; (hence, E=(-r,0,0))

$|O''I|=r'$; (hence, I=(-r',0,d-d'))

$|EF|=l$;

$|IJ|=l'$;

$\angle EFF'=\theta$; (hence, F=(-r-l sin θ,0,-l cos θ))

$\angle JII'=\beta$ (hence, J=(-r'-l' sin β,0,-l' cos β+d'))

$\angle OCF=\alpha/2$ $\angle OCE=\phi/2$ where α is the horizontal field of view (FOV) of the camera and φ is the effective horizontal field of view.

Consideration was given to methods for constructing a three-channel reflector 10 according to the present disclosure, having any desired properties. The construction process also computed left and right virtual cameras with respect to mirrors IJ and EF, respectively. First, it was necessary to determine an appropriate "effective horizontal field of view (HFOV)" φ and an appropriate nodal point location for the camera (see FIG. 6). Finding an effective HFOV is equivalent to finding the value of r, the distance between O and E. If the distance between the pinhole of the camera and the front end of its lens is $d_1$ then finding an appropriate value for d is equivalent to finding $d_2$, the distance between the front end of the camera and O. It should be noted that it is known to find $d_1$ a special device called a "pan head."

Two conditions were used to compute these two parameters. First, $$\tan\left(\frac{\alpha}{2}\right) = \frac{|ME|+r}{d_1+d_2}$$

Setting $|ME|=3r$, i.e., making the size of the left view was 50% bigger than the central view, provided $$\tan\left(\frac{\alpha}{2}\right) = \frac{4r}{d_1+d_2} \quad (1)$$

On the other hand, by requiring the three channel reflector 10 to see an object of the horizontal size of $2Q_X$ at $Q_Z$ ($Q_X$, $Q_Z$: positive) through the opening EH (see FIG. 2), it was necessary that $$\frac{r}{Q_x} = \frac{d_1+d_2}{d_1+d_2+Q_z} \quad (2)$$

Hence, (1) and (2) provided $$\begin{cases} d_2 = \dfrac{4Q_x}{\tan(\alpha/2)} - Q_x - d_1 \\ r = Q_x - \dfrac{1}{4}Q_z\tan(\alpha/2) \end{cases} \quad (3)$$

Having the value of r provided the location of E. It was also required that F must be a point lying on the ray CM to ensure the left view was indeed 1.5 the size of the central view. F could be determined by either l or θ. Initially, l was left as a variable, and it was assumed that the location of F (and, so, the angle θ) was known.

Figure 7:
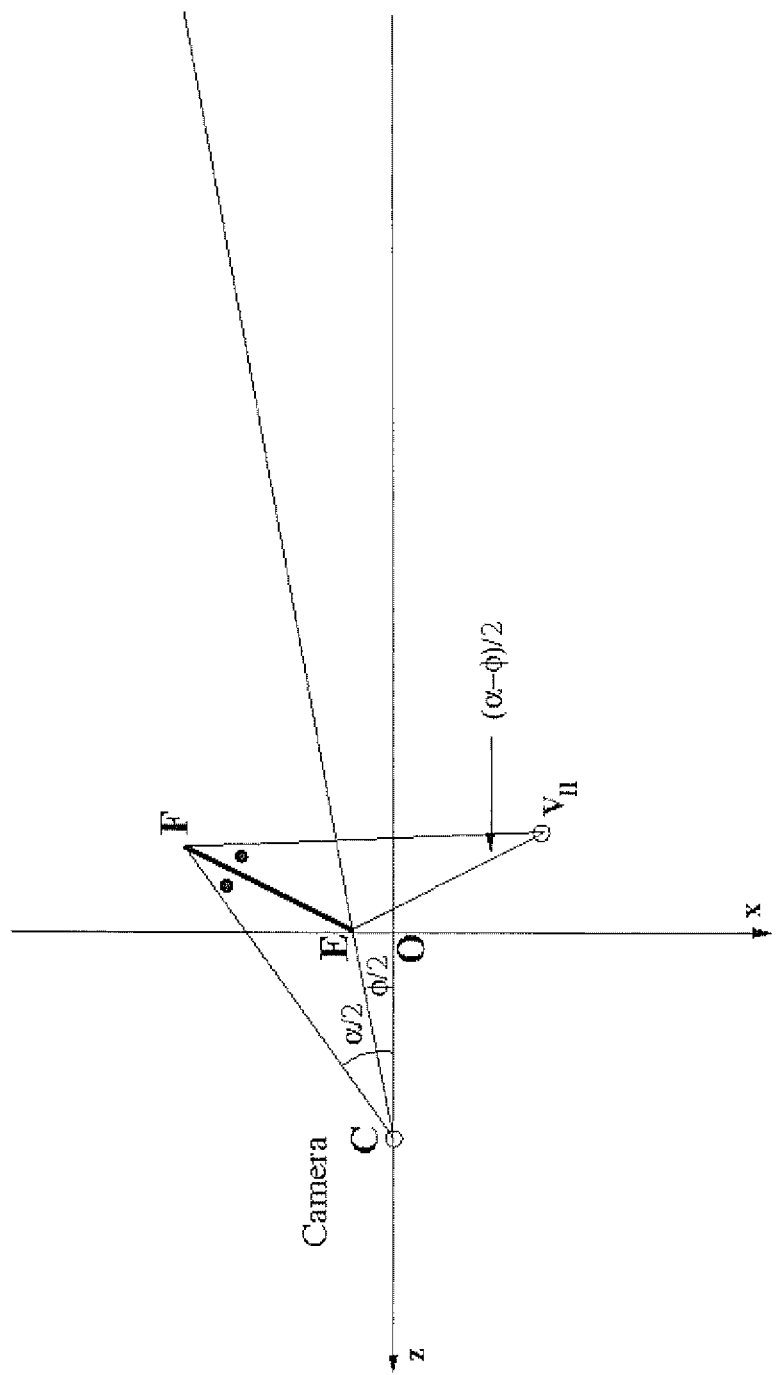
FIG. 7 schematically depicts computation of $V_{ll}$.

Next was to determine the location of $V_{II}$, the reflection of C with respect to the line EF (or, virtual camera with respect to mirror EF see FIG. 7). The normal of EF is $N_1$=(cos θ,0,-sin θ). Let $L(t)=C+tN_1$, t≥0. It was necessary to find a $t_0$ so that $L(t_0)$ was a point of the line containing EF, i.e., $(L(t_0)-E) \cdot N_1 = 0$ It is easy to see that $t_0 = -r \cos \theta + d \sin \theta$. Hence, $$V_{II}=C+2\Delta_1 N_1=(2\Delta_1 \cos \theta, 0, d-2\Delta_1 \sin \theta) \quad (4)$$

where $$\Delta_1 = -r \cos \theta + d \sin \theta \quad (5)$$

Figure 8:
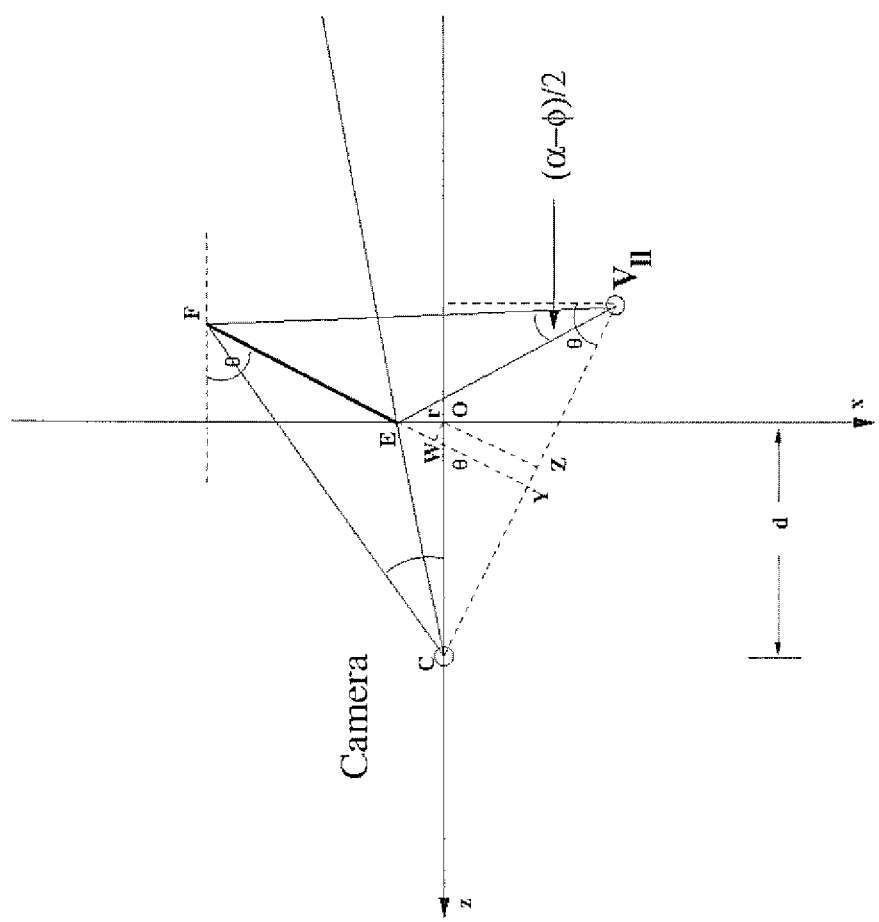
FIG. 8 schematically depicts the geometric meaning of $\Delta_1$.

Geometric meaning of $\Delta_1$ was as follows (see FIG. 8). In FIG. 8, the distance between C and Z was $|CO| \sin \theta$ and the distance between Y and Z was $|OW|=r \cos \theta$. Since the distance between O and C was d, it followed that $|CY|=|CZ|-|YZ|=d \sin \theta - r \cos \theta = \Delta_1$ Hence, $\Delta_1$ was the distance between C and the line EF.

The next step was to determine $V_I$ and IJ ($V_I$ is the reflection of $V_{II}$ about IJ, or vice-versa). Hence, theoretically speaking, IJ should be known before constructing $V_I$. However, the opposite was done. First, $EV_{II}$ was extended beyond E and $FV_{II}$ was extended beyond F to get $E'V_{II}$ and $F'V_{II}$, respectively. Then a line was constructed passing through F and Q and its intersection point with $E'V_{II}$ was found. The intersection point was the location of I. $V_I$ was a point of this line but on a different side of I with respect to F and satisfies the condition $|V_I I|=|IV_{II}|$ (see FIG. 9). J was the intersection point of the bisector of the angle $\angle FLE'$ with $F'V_{II}$. As before, $Q=(Q_X,0,-Q_Z)$ where $Q_X$ and $Q_Z$ were positive constants set by the user.

In computing these points, given two lines $L_1$: $z=m_1x+b_1$ and $L_2$: $z=m_2x+b_2$ (see FIG. 10), the intersection point I was expressed as $I=(I_x,0,I_z)$ where $$I_x = \frac{b_2 - b_1}{m_1 - m_2} \text{ and } I_z = \frac{m_1 b_2 - m_2 b_1}{m_1 - m_2}. \quad (6)$$

Figure 10:
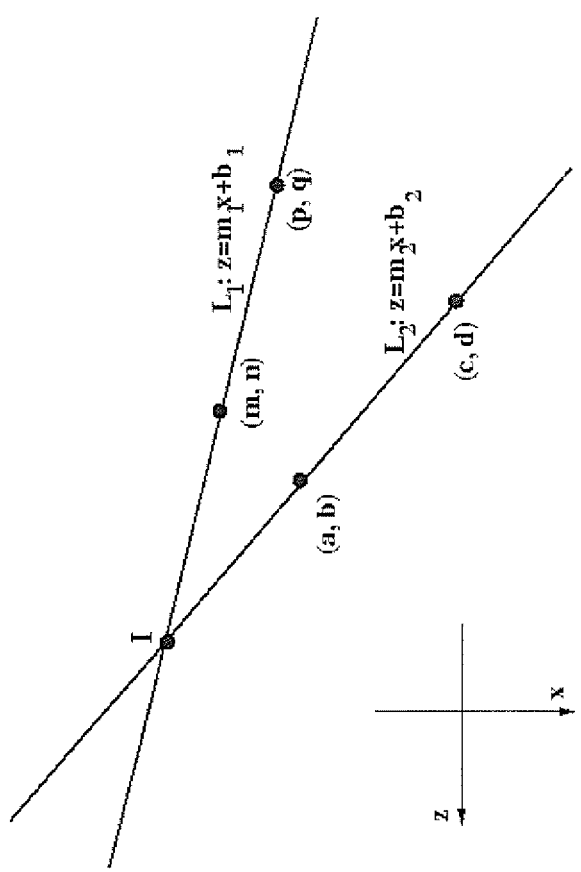
FIG. 10 shows a calculation of the intersection of two lines.

For the case shown in FIG. 10, $$m_1 = \frac{n-q}{m-p}; \quad b_1 = \frac{mq - np}{m-p} \quad (7)$$
$$m_2 = \frac{b-d}{a-c}; \quad b_2 = \frac{ad - bc}{a-c}$$

In the present case, (a,b)=(−r,0), (c,d)=(2Δ₁ cos θ, d−2Δ₁ sin θ), (p,q)=($Q_x$, −$Q_z$) and (m,n)=(−e−l sin θ,−l cos θ) where $\Delta_1$ was defined in (5). As in FIG. 5, r'=$I_x$. Having I, it was possible to compute |I$V_{ll}$| and use this distance to compute $V_l$ on the line FQ. Alternatively, it was possible to compute J (the intersection point of the bisector of the angle ∠E'IF with the line F$V_{ll}$) first.

In computing J first and then computing $V_l$, the equation of the bisector of the angle at I was of the following form $$\frac{|z - m_1 x - b_1|}{\sqrt{1 + m_1^2}} = \frac{|z - m_2 x - b_2|}{\sqrt{1 + m_2^2}}$$

Since (x,z) and the origin were on the opposite sides of each line, z−$m_1$x−$b_1$ and z−$m_2$x−$b_2$ were likewise of the same sign, i.e., providing $$\frac{z - m_1 x - b_1}{\sqrt{1 + m_1^2}} = \frac{z - m_2 x - b_2}{\sqrt{1 + m_2^2}} \quad (8)$$

or $$L_3 : z = m_3 x + b_3$$

where $$m_3 = \frac{m_1 \sqrt{1 + m_2^2} - m_2 \sqrt{1 + m_1^2}}{\sqrt{1 + m_2^2} - \sqrt{1 + m_1^2}}, \quad (9)$$

$$b_3 = \frac{b_1 \sqrt{1 + m_2^2} - b_2 \sqrt{1 + m_1^2}}{\sqrt{1 + m_2^2} - \sqrt{1 + m_1^2}}.$$

Figure 9:
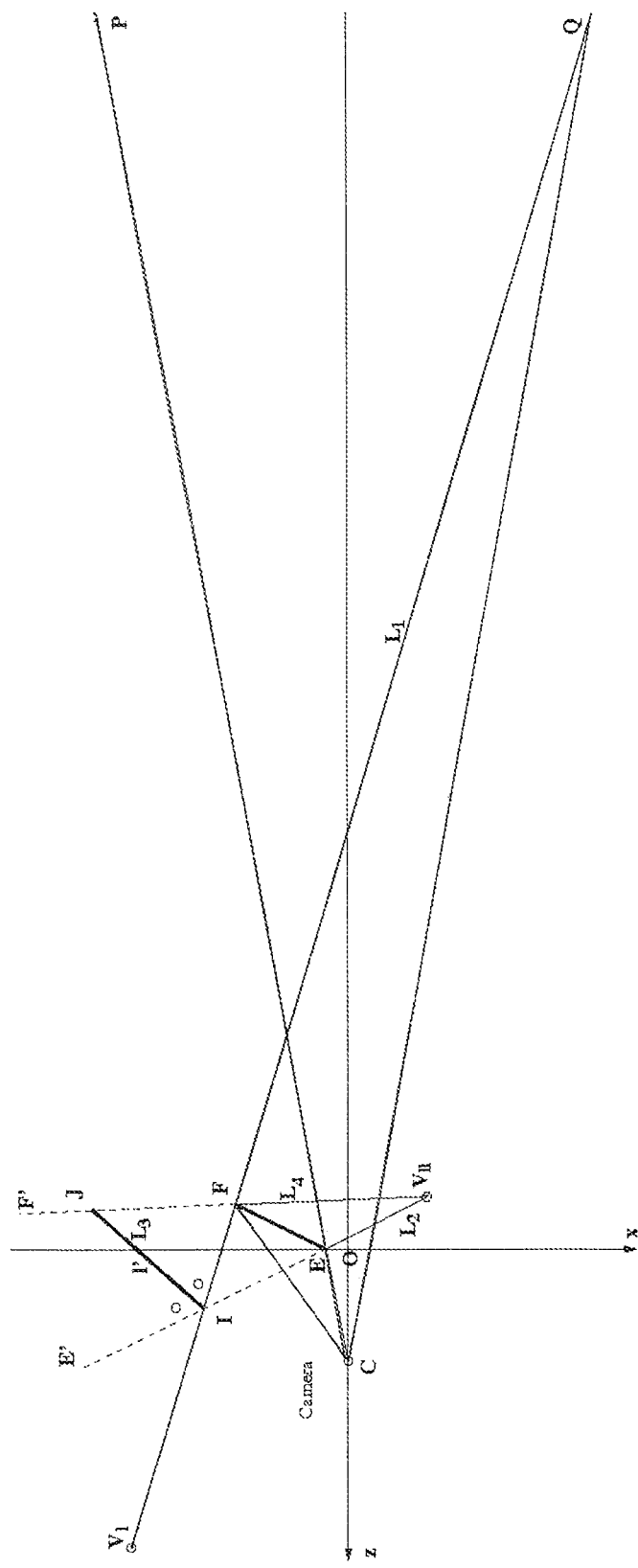
FIG. 9 schematically depicts the calculation of $V_l$ and $IJ$.

J was the intersection point of $L_4$ and $L_3$ (see FIG. 9). $L_4$ was the line that passed through F and $V_{ll}$. $L_4$ were expressed as $$L_4 : z = m_4 x + b_4 \quad (10)$$

where $$m_4 = \frac{F_z - (V_{ll})_z}{F_x - (V_{ll})_x}, \quad b_4 = \frac{F_x (V_{ll})_z - F_z (V_{ll})_x}{F_x - (V_{ll})_x}.$$

Hence, according to (6), J was expressed as J=($J_x$,0,$J_z$) where $$J_x = \frac{b_3 - b_4}{m_4 - m_3}; \quad J_z = \frac{m_4 b_3 - m_3 b_4}{m_4 - m_3}. \quad (11)$$

($m_4$,$b_4$) and ($m_3$,$b_3$) were defined in (10) and (9), respectively.
Having I and J, it was possible to $$l' = |I - J| \text{ and } \beta = \tan^{-1}((I_x - J_x)/(I_z - J_z)) \quad (12)$$

Figure 6:
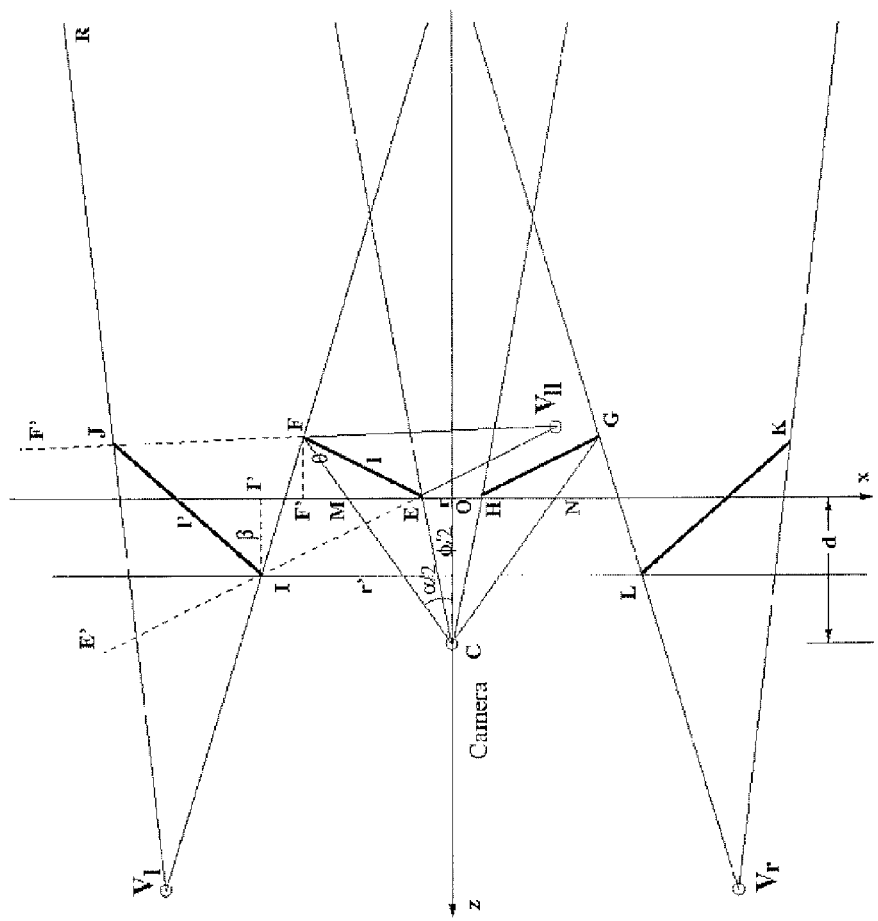
FIG. 6 schematically depicts the top view of the reflector of FIG. 2.
Figure 11:
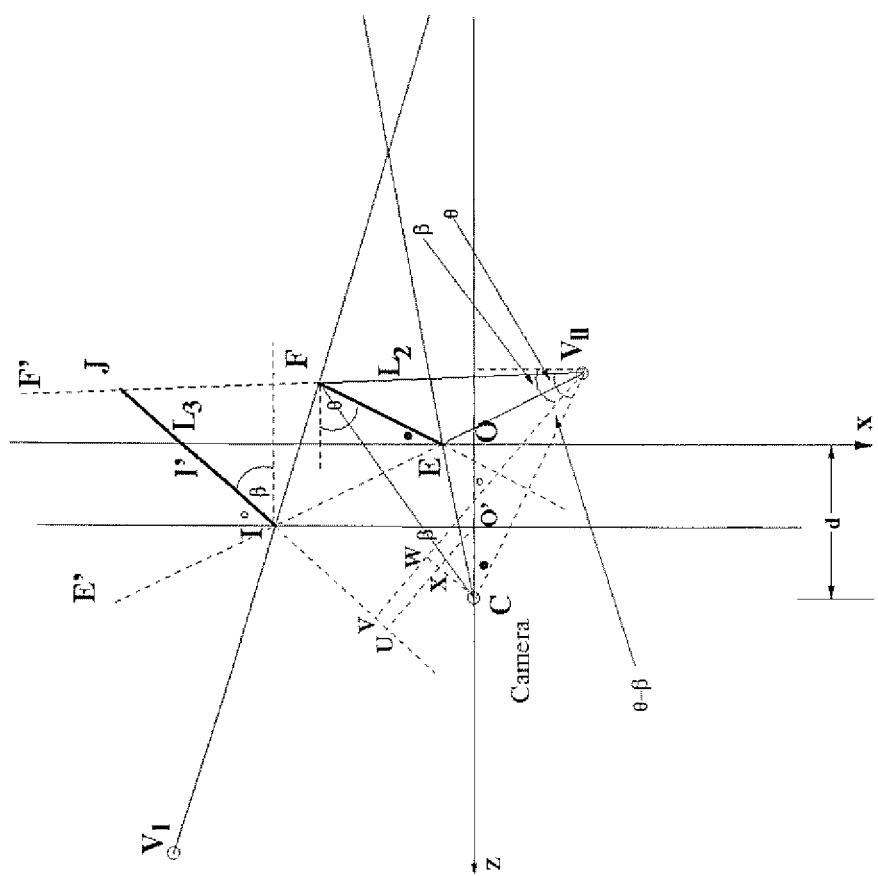
FIG. 11 schematically depicts the geometric meaning of $\Delta_2$.

(see FIGS. 6 and 11). To compute $V_l$, the normal of $\overline{IJ}$ was $$N_2 = (-\cos \beta, 0, \sin \beta) \quad (13)$$

Letting L(t) be a ray that starts at and is perpendicular to $\overline{IJ}$:

$$L(t) = V_{ll} + t N_2, \ t \geq 0$$

It was necessary to find a parameter $t_1$ so that L($t_1$) was a point of the line $\overline{IJ}$, i.e., $$(L(t_1) - I) \cdot N_2 = 0 \text{ or } (V_{ll} + t_1 N_2 - I) \cdot N_2 = 0.$$

Such a $t_1$ was expressed as $$t_1 = (I - V_{ll}) \cdot N_2 = \quad (14)$$
$$((I_x, 0, I_z) - (2\Delta_1 \cos\theta, 0, d - 2\Delta_1 \sin\theta)) \cdot (-\cos\beta, 0, \sin\beta) =$$
$$-I_x \cos\beta + (I_z - d)\sin\beta + 2\Delta_1 \cos(\theta - \beta) = \Delta_2 + 2\Delta_1 \cos(\theta - \beta)$$

where $$\Delta_2 = -I_x \cos\beta + (I_z - d)\sin\beta$$

As shown in FIG. 11, the distance between $V_{ll}$ and the line $\overline{IJ}$ was $|\overline{VW}| + |\overline{WV_{ll}}|$. Since $$|\overline{VW}| = |\overline{UO'}| - |\overline{XO'}| - I_x \cos\beta - (d - I_z)\sin\beta = \Delta_2$$

and $$|\overline{WV_{ll}}| = |\overline{CV_{ll}}|\cos(\theta - \beta) = 2\Delta_1 \cos(\theta - \beta),$$

$\Delta_2 + 2\Delta_1 \cos(\theta - \beta)$ is the distance between $V_{ll}$ and $\overline{IJ}$. Hence, $$V_l = V_{ll} + 2[\Delta_2 + 2\Delta_1 \cos(\theta - \beta)] N_2 = \quad (15)$$
$$C + 2\Delta_1 N_1 + 2\Delta_2 N_2 + 4\Delta_1 \cos(\theta - \beta) N_2 =$$
$$C + 2\Delta_2 N_2 + 2\Delta_1 [N_1 + 2\cos(\theta - \beta) N_2] = C + 2\Delta_2 N_2 + 2\Delta_1 N_3$$

where $$N_3 = (-\cos(2\beta - \theta), 0, \sin(2\beta - \theta)) \quad (16)$$

Figure 12:
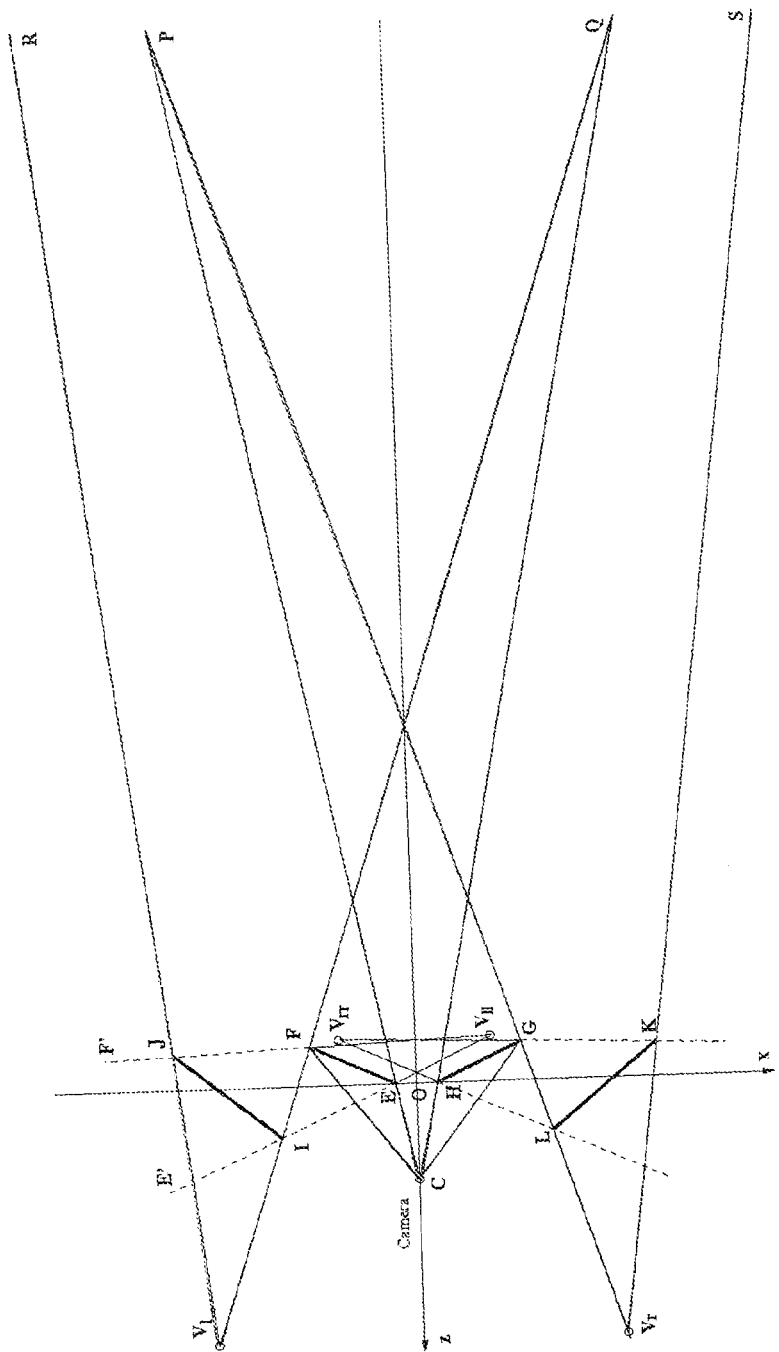
FIG. 12 schematically depicts reflecting an upper part of a three-channel reflector according to the present disclosure about its z-axis.

Having I, J and $V_l$, the last step was to reflect the upper part about the z-axis to get the lower part of the three-channel reflector 10 (see FIG. 12). G, H, K and L were symmetric to F, E, J and I, and $V_{rr}$ and $V_r$ were symmetric to $V_{ll}$ and $V_l$, respectively. Thus $$V_{rr} = C + 2\Delta_1 N_4 \quad (17)$$

where $\Delta_1$ is defined in (5) and $$N_4 = (-\cos \theta, 0, -\sin \theta) \quad (18)$$

and $$V_r = C + 2\Delta_2 N_5 + 2\Delta_1 N_6 \quad (19)$$

where $\Delta_2$ is defined in (14) and $$N_5 = (\cos \beta, 0, \sin \beta); N_6 = (\cos(2\beta - \theta), 0, \sin(2\beta - \theta)). \quad (20)$$

Two options were considered for determining l. The first was to choose an l that would minimize the distance between $V_l$ and $V_r$ while satisfying the viewing requirement.
From (15) and (19), the left virtual camera $V_l$ and the right virtual camera $V_r$ were $$V_l C + 2\Delta_2 N_2 + 2\Delta_1 N_3 \text{ and } V_r = C + 2\Delta_2 N_5 + 2\Delta_1 N_6,$$

respectively, where $$\Delta_1 = r \cos \theta + d \sin \theta; \ \Delta_2 = -I_x \cos \beta + (I_z - d) \sin \beta;$$

$$N_2 = (-\cos \beta, 0, \sin \beta); N_3 = (-\cos(2\beta - \theta), 0, \sin(2\beta - \theta));$$

$$N_5 = (\cos \beta, 0, \sin \beta); N_6 = (\cos(2\beta - \theta), 0, \sin(2\beta - \theta))$$

(see FIG. 6). Therefore, the distance between $V_l$ and $V_r$ was $$|V_l - V_r| = |2\Delta_2(N_2 - N_5) + 2\Delta_1(N_3 - N_6)| = \qquad (21)$$
$$|2\Delta_2(-2\cos\beta, 0, 0) + 2\Delta_1(-2\cos(2\beta - \theta), 0, 0)| =$$
$$4(\Delta_2\cos\beta + \Delta_1\cos(2\beta - \theta)).$$

All the parameters in the expression (21) were functions of l. Hence, it was possible to find an l that would satisfy all the conditions given above while minimizing (21).

Figure 13:
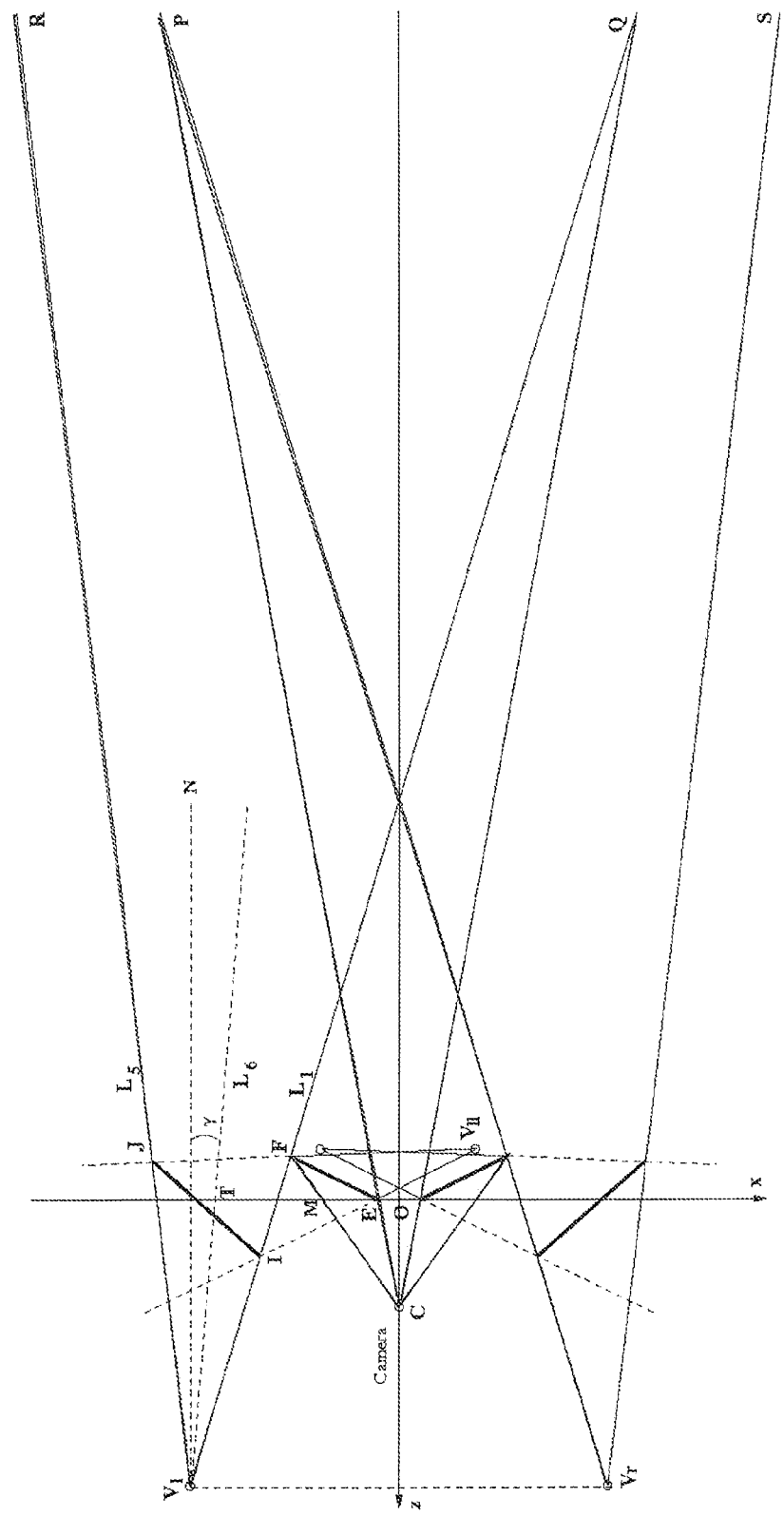
FIG. 13 schematically depicts the distance between virtual cameras and an angle between a bisector $L_5$ and an optical center.

Alternatively, consideration was given to choosing an l that would minimize the angle between the bisector of $\angle IV_rJ$ and the optical center (i.e., making the bisector of $\angle IV_rJ$ as parallel to the optical center as possible) while satisfying the viewing requirement. For this option, it was necessary to find the bisector of $L_5$ and $L_1$ (see FIG. 13). $L_5$ was the line passing through $V_1$ and J. $L_5$ was expressed as $$L_5 : z = m_5 x + b_5 \qquad (22)$$

where $$m_5 = \frac{(V_l)_z - J_z}{(V_l)_x - J_x}, \quad b_5 = \frac{J_z(V_l)_x - J_x(V_l)_z}{(V_l)_x - J_x}$$

Following the idea in building the bisector for the angle $\angle FIE'$ (see FIG. 9), the bisector of $\angle IV_rJ$, called $L_6$, was expressed as $$\frac{z - m_5 x - b_5}{\sqrt{1 + m_5^2}} = \frac{-z + m_1 x + b_1}{\sqrt{1 + m_1^2}} \qquad (23)$$

or $$L_6 : z = m_6 x + b_6$$

where $$m_6 = \frac{m_1\sqrt{1 + m_5^2} + m_5\sqrt{1 + m_1^2}}{\sqrt{1 + m_1^2} + \sqrt{1 + m_5^2}}, \qquad (24)$$

$$b_6 = \frac{b_1\sqrt{1 + m_5^2} + b_5\sqrt{1 + m_1^2}}{\sqrt{1 + m_1^2} + \sqrt{1 + m_5^2}}$$

Setting z=0 in (23) provided $x=-b_6/m_6$. This was the x coordinate of T, the intersection point of $L_6$ with the x-axis (see FIG. 13). Hence, the angle between $L_6$ and the optical center, called γ, was expressed as $$\gamma = \tan^{-1}\left(\frac{-b_6/m_6 - (V_l)_x}{(V_l)_z}\right) \qquad (25)$$

All the parameters in (25) were functions of l. An l that minimized (25) while satisfying all the constraints was a solution for this option.

One of ordinary skill in the art will recognize that additional embodiments of the invention are also possible without departing from the teachings herein. For example, the skilled artisan will appreciate that the above-described devices, and methods and software therefore, are adaptable to a variety of applications, including document cameras, endoscopy, three-dimensional Web cameras, and the like. The foretwintz description is presented for purposes of illustration and description of the various aspects of the invention. One of ordinary skill in the art will recognize that additional embodiments of the invention are possible without departing from the teachings herein. This detailed description, and particularly the specific details of the exemplary embodiments, is given primarily for clarity of understanding, and no unnecessary limitations are to be imported, for modifications will become obvious to those skilled in the art upon reading this disclosure and may be made without departing from the spirit or scope of the invention. Relatively apparent modifications, of course, include combining the various features of one or more figures with the features of one or more of other figures. All such modifications and variations are within the scope of the invention as determined by the appended claims when interpreted in accordance with the breadth to which they are fairly, legally and equitably entitled.

What is claimed is:

1. A system for providing a three-dimensional representation of a scene from a single image, comprising:
    a reflector apparatus for providing an image of a scene comprising three adjacent views of the scene, said apparatus defining a left light path, a center light path, and a right light path; and
    an imager;
    wherein each of the left light path and the right light path comprise opposed reflective surfaces for redirecting light;
    further wherein the left light path and the right light path opposed reflective surfaces are arrayed whereby each of light passing through the left light path, light passing through the right light path, and light passing through the center light path converge at a nodal point of said imager.

2. The system of claim 1, wherein the reflective surfaces are fabricated of or coated with a material for substantially eliminating double images.

3. The system of claim 1, including an imager for converting the three-view image into digital data.

4. The system of claim 3, wherein light passing through the left light path, light passing through the right light path, and light passing through the center light path converge at a nodal point of the imager to reach said imager's image pickup device.

5. The system of claim 3, wherein the imager is selected from the group consisting of a still camera, a video camera, a digital still camera, a digital video camera, and a Web camera.

6. The system of claim 1, wherein the image of the scene comprises three adjacent views of the scene arrayed in a three-by-one rectangular grid;
    further wherein the three adjacent views consist of a left view, a central view, and a right view, with the left view and the right view having a size dimension that is larger than the central view size dimension.

7. The system of claim 6, further including a client computing device for receiving data from the imager and for transforming said data into a stereoscopic image or an image-plus-depth rendering.

8. The system of claim 7, wherein the step of rendering said data into a stereoscopic image comprises:
    obtaining a three view image from a single scene;
    identifying a region in the central view of said three view image;
    identifying a corresponding region in the left view and the right view;

interlacing the left, and right images of the identified regions to generate an interlaced image of the identified region; and outputting said interlaced image to a display panel for displaying stereoscopic images.

9. The system of claim 2, wherein the reflector apparatus comprises a unitary body fabricated of a substantially transparent material and the reflective surfaces are provided by plating with a suitably reflective metal.

10. The system of claim 9, wherein the substantially transparent material is selected from one of polymethylmethacrylate or glass.

11. The system of claim 9, wherein the suitably reflective metal is selected from the group consisting of aluminum, silver, and mercury.

12. A computing system for rendering a single three view image into a stereoscopic image or an image-plus-depth rendering, comprising:

an imager for converting the three view image into digital data;

a reflector apparatus for providing an image of a scene comprising three adjacent views of the scene, said apparatus defining a left light path, a center light path, and a right light path, wherein each of the left light path and the right light path comprise opposed reflective surfaces for redirecting light whereby the left light path and the right light path reflective surfaces are arrayed whereby each of light passing through the left light path, light passing through the right light path, and light passing through the center light path converge at a nodal point of the imager; and at least one computing device for receiving data from the imager;

wherein the computing device, for one region on a central view of the received three-view image, identifies corresponding regions on a left view and a right view in the three-view image;

further wherein the computing device, for the one region on the central view of the received three-view image, identifies corresponding regions on the right view and left view and interlaces the left, and right images of the identified one region;

said corresponding region data being interlaced to provide a stereoscopic image.

13. The computing system of claim 12, further including a display for displaying a three-dimensional image generated by the computing device.

14. The computing system of claim 12, wherein the reflective surfaces are fabricated of or coated with a material for eliminating double images.

15. The computing system of claim 14, wherein light passing through the left light path, light passing through the right light path, and light passing through the center light path converge at a nodal point of the imager to reach a CCD of said imager.

16. The computing system of claim 12, wherein the imager is selected from the group consisting of a still camera, a video camera, a digital still camera, a digital video camera, and a Web camera.

17. The computing system of claim 12, wherein the image of the scene comprises three adjacent views of the scene arrayed in a three-by-one rectangular grid;

further wherein the three adjacent views consist of a left view, a central view, and a right view, with the left view and the right view having a size dimension that is larger than the central view size dimension.

* * * * *